(12) United States Patent
Chen et al.

(10) Patent No.: US 11,735,776 B2
(45) Date of Patent: Aug. 22, 2023

(54) ELECTROLYTES FOR ELECTROCHEMICAL CELLS

(71) Applicant: GM GLOBAL TECHNOLOGY OPERATIONS LLC, Detroit, MI (US)

(72) Inventors: Shuru Chen, Troy, MI (US); Meinan He, Sterling Heights, MI (US); Fang Dai, Troy, MI (US); Mark Verbrugge, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 17/412,895

(22) Filed: Aug. 26, 2021

(65) Prior Publication Data
US 2023/0064146 A1  Mar. 2, 2023

(51) Int. Cl.
*H01M 4/00* (2006.01)
*H01M 10/0569* (2010.01)
*H01M 4/505* (2010.01)
*H01M 4/525* (2010.01)
*H01M 4/58* (2010.01)
*H01M 4/38* (2006.01)

(52) U.S. Cl.
CPC ....... *H01M 10/0569* (2013.01); *H01M 4/382* (2013.01); *H01M 4/505* (2013.01); *H01M 4/525* (2013.01); *H01M 4/5815* (2013.01); *H01M 2300/0034* (2013.01); *H01M 2300/0037* (2013.01)

(58) Field of Classification Search
CPC ...... H01M 4/587; H01M 4/134; H01M 4/525; H01M 4/133; H01M 10/0568; H01M 4/386; H01M 4/505; H01M 10/052
See application file for complete search history.

(56) References Cited

U.S. PATENT DOCUMENTS

| | | | |
|---|---|---|---|
| 2018/0309169 A1 | 10/2018 | Yang et al. | |
| 2019/0058210 A1 | 2/2019 | Dai et al. | |
| 2019/0058219 A1 | 2/2019 | Yang et al. | |
| 2020/0052338 A1 | 2/2020 | Liu et al. | |

FOREIGN PATENT DOCUMENTS

| | | | | |
|---|---|---|---|---|
| CN | 115732761 A | 3/2023 | | |
| DE | 102022110691 A1 | 3/2023 | | |
| WO | WO-2020131175 A1 * | 6/2020 | ......... | H01M 10/052 |

* cited by examiner

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

The present disclosure provides an electrolyte system for an electrochemical cell that cycles lithium ions. The electrolyte system may include an aliphatic fluorinated disulfonimide lithium salt in a mixture of organic solvents. The mixture of organic solvents may include a first solvent and a second solvent. The first solvent may include an ether solvent, a carbonate solvent, or a mixture of ether and carbonate solvents. The second solvent may include a fluorinated ether. A molar ratio of the aliphatic fluorinated disulfonimide lithium salt to the first solvent may be greater than or equal to about 1:1.2 to less than or equal to about 1:2. A molar ratio of the first solvent to the second solvent may be greater than or equal to about 1:1 to less than or equal to about 1:4.

19 Claims, 1 Drawing Sheet

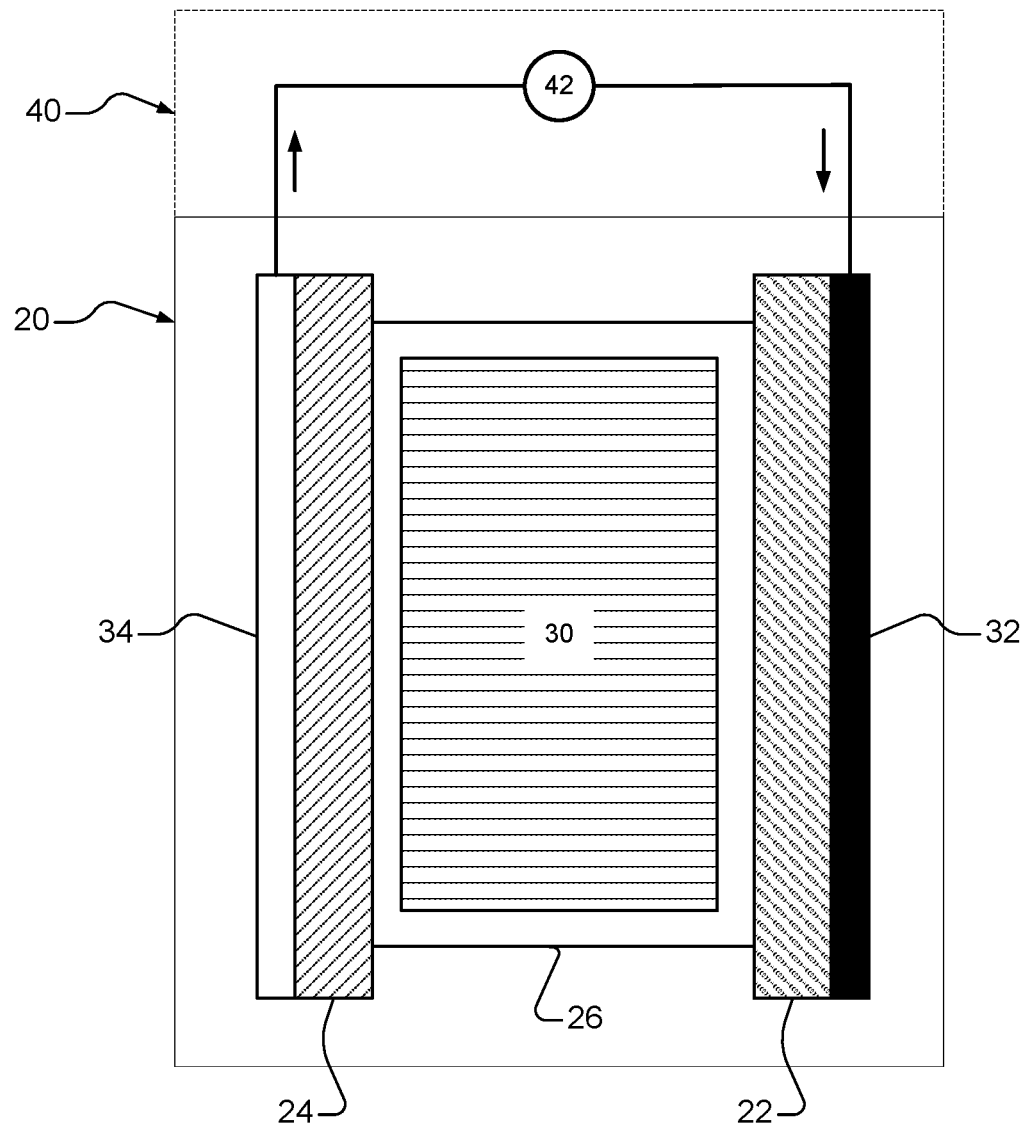

ELECTROLYTES FOR ELECTROCHEMICAL CELLS

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical electrochemical cells of secondary lithium ion batteries include at least two electrodes and an electrolyte and/or separator. One of the two electrodes may serve as a positive electrode or cathode and the other electrode may serve as a negative electrode or anode. A separator may be disposed between the negative and positive electrodes. The separator includes an electrolyte that may, in certain aspects, also be present in one or both of the electrodes. The electrolytes generally include a lithium salt dissolved or dispersed in one or more aprotic organic solvents. The electrolyte is suitable for conducting lithium ions between the electrodes.

SUMMARY

This section provides a general summary of the disclosure, and is not a comprehensive disclosure of its full scope or all of its features.

The present disclosure relates to electrolytes for electrochemical cells, and to methods of making and using the same. The electrolytes may be aprotic liquid electrolytes. The electrochemical cells may be included in secondary lithium metal batteries, including, for example, lithium-NMC batteries and/or lithium-sulfur batteries).

In various aspects, the present disclosure provides an electrolyte system for an electrochemical cell that cycles lithium ions. The electrolyte system may include an aliphatic fluorinated disulfonimide lithium salt in a mixture of organic solvents. The mixture of organic solvents may include a first solvent and a second solvent. The first solvent may include an ether solvent, a carbonate solvent, or a mixture of ether and carbonate solvents. The second solvent may include a fluorinated ether.

In one aspect, the aliphatic fluorinated disulfonimide lithium salt may be selected from the group consisting of: lithium bis(fluorosulfonyl)imide, lithium bis(trifluoromethanesulfonyl)imide, lithium (fluorosulfonyl)(trifluoromethanesulfonyl)imide), and combinations thereof.

In one aspect, a molar ratio of the aliphatic fluorinated disulfonimide lithium salt to the first solvent may be greater than or equal to about 1:1.2 to less than or equal to about 1:2.

In one aspect, a molar ratio of the first solvent to the second solvent may be greater than or equal to about 1:1 to less than or equal to about 1:4.

In one aspect, the ether solvent may be a chain ether selected from the group consisting of: 1,2-dimethoxyethane (DME), 1-2-diethoxyethane, ethoxymethoxyethane, and combinations thereof.

In one aspect, the ether solvent may be a cyclic ether selected from the group consisting of: tetrahydrofuran, 2-methyltetrahydrofuran, and combinations thereof.

In one aspect, the ether solvent may be selected from the group consisting of: 1,2-dimethoxyethane (DME), 1-2-diethoxyethane, ethoxymethoxyethane, tetrahydrofuran, 2-methyltetrahydrofuran, and combinations thereof.

In one aspect, the carbonate solvent may be a cyclic carbonate selected from the group consisting of: ethylene carbonate (EC), propylene carbonate (PC), butylene carbonate (BC), fluoroethylene carbonate (FEC), and combinations thereof.

In one aspect, the carbonate solvent may be a linear carbonate selected from the group consisting of: dimethyl carbonate (DMC), diethyl carbonate (DEC), ethylmethylcarbonate (EMC), and combinations thereof.

In one aspect, the carbonate solvent may be selected from the group consisting of: ethylene carbonate (EC), propylene carbonate (PC), butylene carbonate (BC), fluoroethylene carbonate (FEC), dimethyl carbonate (DMC), diethyl carbonate (DEC), ethylmethylcarbonate (EMC), and combinations thereof.

In one aspect, the fluorinated ether may be selected from the group consisting of: bis(2,2,2-trifluoroethyl)ether (BTFE), 1,1,2,2-tetrafluoroethyl 2,2,3,3-tetrafluoropropyl ether (TTE), 1,1,2,2-tetrafluoroethyl-2,2,3,3-tetrafluoropropyl ether, 1,1,2,3,3,3-hexafluoropropyl 2,2,2-trifluoroethyl ether, and combinations thereof.

In various aspects, the present disclosure provides an electrochemical cell that cycles lithium ions. The electrochemical cell may include a first electrode, a second electrode, a separator disposed between the first and second electrodes, and an electrolyte system disposed within at least one of the first electrode, the second electrode, and the separator. The first electrode may include first electroactive material. The second electrode may include a second electroactive material. The electrolyte system may include an aliphatic fluorinated disulfonimide lithium salt in a mixture of organic solvents. The mixture of organic solvents may include a first solvent and a second solvent. The first solvent may include an ether solvent, a carbonate solvent, or a mixture of ether and carbonate solvents. The second solvent may include a fluorinated ether.

In one aspect, the aliphatic fluorinated disulfonimide lithium salt may be selected from the group consisting of: lithium bis(fluorosulfonyl)imide, lithium bis(trifluoromethanesulfonyl)imide, lithium (fluorosulfonyl)(trifluoromethanesulfonyl)imide), and combinations thereof.

In one aspect, the first electroactive material may be a high-nickel positive electroactive material represented by $Ni_xMn_yCo_zO_2$, where x, y, and z are all ≤1 and x+y+z=1.

In one aspect, the first electroactive material may be a sulfur-containing positive electroactive material selected from the group consisting of: sulfur (S), sulfur-selenium (S—Se), sulfur-silicon (S—Si), sulfur-polyacrylonitrile (S-PAN), and combinations thereof.

In one aspect, the second electroactive material may include a lithium metal.

In one aspect, a molar ratio of the aliphatic fluorinated disulfonimide lithium salt to the first solvent may be greater than or equal to about 1:1.2 to less than or equal to about 1:2.

In one aspect, a molar ratio of the first solvent to the second solvent may be greater than or equal to about 1:1 to less than or equal to about 1:4.

In one aspect, the ether solvent may be selected from the group consisting of: 1,2-dimethoxyethane (DME), 1-2-diethoxyethane, ethoxymethoxyethane, tetrahydrofuran, 2-methyltetrahydrofuran, and combinations thereof, the carbonate solvent may be selected from the group consisting of: ethylene carbonate (EC), propylene carbonate (PC), butylene carbonate (BC), fluoroethylene carbonate (FEC), dimethyl carbonate (DMC), diethyl carbonate (DEC), ethylmethylcarbonate (EMC), and combinations thereof, and the fluorinated ether may be selected from the group consisting of: bis(2,2,2-trifluoroethyl)ether (BTFE), 1,1,2,2-tetrafluoroethyl 2,2,3,3-tetrafluoropropyl ether (TTE), 1,1,2,2-tetrafluoroethyl-2,2,3,3-tetrafluoropropyl ether, 1,1,2,3,3,3-hexafluoropropyl 2,2,2-trifluoroethyl ether, and combinations thereof.

In various aspects, the present disclosure provides an electrolyte system for an electrochemical cell that cycles lithium ions. The electrolyte system may include an aliphatic fluorinated disulfonimide lithium salt in a mixture of organic solvents. The mixture of organic solvents may include a first solvent and a second solvent. A molar ratio of the first solvent to the second solvent may be greater than or equal to about 1:1 to less than or equal to about 1:4. A molar ratio of the aliphatic fluorinated disulfonimide lithium salt to the first solvent may be greater than or equal to about 1:1.2 to less than or equal to about 1:2. The first solvent may include an ether solvent, a carbonate solvent, or a mixture of ether and carbonate solvents. The second solvent may be a fluorinated ether.

In various aspects, the present disclosure provides an electrolyte system for an electrochemical cell that cycles lithium ions. The electrolyte system consists essentially of an aliphatic fluorinated disulfonimide lithium salt in a mixture of organic solvents, where the aliphatic fluorinated disulfonimide lithium salt is selected from the group consisting of: lithium bis(fluorosulfonyl)imide, lithium bis(trifluoromethanesulfonyl)imide, lithium (fluorosulfonyl)(trifluoromethanesulfonyl)imide), and combinations thereof, the first solvent includes an ether solvent, a carbonate solvent, or a mixture of ether and carbonate solvents, and the second solvent is a fluorinated ether.

In one aspect, a molar ratio of the first solvent to the second solvent may be greater than or equal to about 1:1 to less than or equal to about 1:4.

In one aspect, a molar ratio of the aliphatic fluorinated disulfonimide lithium salt to the first solvent may be greater than or equal to about 1:1.2 to less than or equal to about 1:2.

In one aspect, the ether solvent may be selected from the group consisting of: 1,2-dimethoxyethane (DME), 1-2-diethoxyethane, ethoxymethoxyethane, tetrahydrofuran, 2-methyltetrahydrofuran, and combinations thereof, the carbonate solvent may be selected from the group consisting of: ethylene carbonate (EC), propylene carbonate (PC), butylene carbonate (BC), fluoroethylene carbonate (FEC), dimethyl carbonate (DMC), diethyl carbonate (DEC), ethylmethylcarbonate (EMC), and combinations thereof, and the fluorinated ether may be selected from the group consisting of: bis(2,2,2-trifluoroethyl)ether (BTFE), 1,1,2,2-tetrafluoroethyl 2,2,3,3-tetrafluoropropyl ether (TTE), 1,1,2,2-tetrafluoroethyl-2,2,3,3-tetrafluoropropyl ether, 1,1,2,3,3,3-hexafluoropropyl 2,2,2-trifluoroethyl ether, and combinations thereof.

In various aspects, the present disclosure provides an electrolyte system for an electrochemical cell that cycles lithium ions. The electrolyte system consists of an aliphatic fluorinated disulfonimide lithium salt in a mixture of organic solvents, where the aliphatic fluorinated disulfonimide lithium salt is selected from the group consisting of: lithium bis(fluorosulfonyl)imide, lithium bis(trifluoromethanesulfonyl)imide, lithium (fluorosulfonyl)(trifluoromethanesulfonyl)imide), and combinations thereof, the first solvent includes an ether solvent, a carbonate solvent, or a mixture of ether and carbonate solvents, and the second solvent is a fluorinated ether.

In one aspect, a molar ratio of the first solvent to the second solvent may be greater than or equal to about 1:1 to less than or equal to about 1:4.

In one aspect, a molar ratio of the aliphatic fluorinated disulfonimide lithium salt to the first solvent may be greater than or equal to about 1:1.2 to less than or equal to about 1:2.

In one aspect, the ether solvent may be selected from the group consisting of: 1,2-dimethoxyethane (DME), 1-2-diethoxyethane, ethoxymethoxyethane, tetrahydrofuran, 2-methyltetrahydrofuran, and combinations thereof, the carbonate solvent may be selected from the group consisting of: ethylene carbonate (EC), propylene carbonate (PC), butylene carbonate (BC), fluoroethylene carbonate (FEC), dimethyl carbonate (DMC), diethyl carbonate (DEC), ethylmethylcarbonate (EMC), and combinations thereof, and the fluorinated ether may be selected from the group consisting of: bis(2,2,2-trifluoroethyl)ether (BTFE), 1,1,2,2-tetrafluoroethyl 2,2,3,3-tetrafluoropropyl ether (TTE), 1,1,2,2-tetrafluoroethyl-2,2,3,3-tetrafluoropropyl ether, 1,1,2,3,3,3-hexafluoropropyl 2,2,2-trifluoroethyl ether, and combinations thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWING

The drawing described herein is for illustrative purposes only of selected embodiments and not all possible implementations, and is not intended to limit the scope of the present disclosure.

FIG. 1 is a schematic of an example electrochemical battery cell.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the FIGURES. Spatially or temporally relative terms may be intended to encompass different orientations of the device or system in use or operation in addition to the orientation depicted in the FIGURES.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawing.

The present disclosure relates to electrolytes for electrochemical cells, and to methods of making and using the same. The electrolytes may be aprotic liquid electrolytes. The electrochemical cells may be included in secondary lithium metal batteries, including, for example, lithium-NMC batteries and/or lithium-sulfur batteries).

In various aspects, the electrolyte system includes an aliphatic fluorinated disulfonimide lithium salt in a mixture of organic solvents. The mixture of organic solvents may include a first solvent and a second solvent. The first solvent may include an ether solvent, a carbonate solvent, or a mixture of ether and carbonate solvents. The second solvent may include a fluorinated ether.

In various aspects, the electrolyte system consists essentially of an aliphatic fluorinated disulfonimide lithium salt in a mixture of organic solvents, where the aliphatic fluorinated disulfonimide lithium salt is selected from the group consisting of: lithium bis(fluorosulfonyl)imide, lithium bis(trifluoromethanesulfonyl)imide, lithium (fluorosulfonyl)(trifluoromethanesulfonyl)imide), and combinations thereof, the first solvent includes an ether solvent, a carbonate solvent, or a mixture of ether and carbonate solvents, and the second solvent is a fluorinated ether.

In various aspects, the electrolyte system consists of an aliphatic fluorinated disulfonimide lithium salt in a mixture of organic solvents, where the aliphatic fluorinated disulfonimide lithium salt is selected from the group consisting of: lithium bis(fluorosulfonyl)imide, lithium bis(trifluoromethanesulfonyl)imide, lithium (fluorosulfonyl)(trifluoromethanesulfonyl)imide), and combinations thereof, the first solvent includes an ether solvent, a carbonate solvent, or a mixture of ether and carbonate solvents, and the second solvent is a fluorinated ether.

A typical lithium metal battery includes a first electrode (such as a positive electrode or cathode) opposing a second electrode (such as a negative electrode or anode) and a separator and/or electrolyte disposed therebetween. Often, in a lithium metal battery pack, batteries or cells may be electrically connected in a stack or winding configuration to increase overall output. Lithium metal batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions and may be in liquid, gel, or solid form. For example, an exemplary and schematic illustration of an electrochemical cell (also referred to as the battery) 20 is shown in FIG. 1.

Such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples include a single positive electrode cathode and a single anode, the skilled artisan will recognize that the present teachings extend to various other configurations, including those having one or more cathodes and one or more anodes, as well as various current collectors with electroactive layers disposed on or adjacent to one or more surfaces thereof.

The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24.

A negative electrode current collector 32 may be positioned at or near the negative electrode 22. The negative electrode current collector 32 may be a metal foil, metal grid or screen, or expanded metal comprising copper or any other appropriate electrically conductive material known to those of skill in the art. A positive electrode current collector 34 may be positioned at or near the positive electrode 24. The positive electrode current collector 34 may be a metal foil, metal grid or screen, or expanded metal comprising aluminum or any other appropriate electrically conductive material known to those of skill in the art. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of metallic lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the positive electrode 24 is unable to uptake, or absorb, more lithium at the selected discharge voltage, and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., deposited lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium metal battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the present technology also applies to semi-solid-state batteries that include both a liquid electrolyte 30 and solid-state electrolytes (e.g., solid-state electroactive particles) that may have different designs as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium metal cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. As further detailed below, the electrolyte 30 in accordance with various aspects of the present disclosure enables high energy and long cycle life of the battery 20.

In various aspects, the electrolyte 30 is a non-aqueous liquid electrolyte solution that includes a lithium salt dissolved or dispersed in an organic solvent or a mixture of organic solvents. The lithium salt may be an aliphatic fluorinated disulfonimide lithium salt. The aliphatic fluorinated disulfonimide lithium salt may be selected from the group consisting of: lithium bis(fluorosulfonyl)imide, lithium bis(trifluoromethanesulfonyl)imide, lithium (fluorosulfonyl)(trifluoromethanesulfonyl)imide), and combinations thereof.

In various aspects, the mixture of organic solvents includes one or more co-solvents. For example, the mixture of organic solvents includes a first solvent and a second solvent. The first solvent may include ether solvents, carbonate solvents, or a mixture of ether and carbonate solvents. The ether solvents may include chain structure ethers (e.g., 1,2-dimethoxyethane (DME), 1-2-diethoxyethane, ethoxymethoxyethane) and/or cyclic ethers (e.g., tetrahydrofuran, 2-methyltetrahydrofuran). The carbonate solvents may include cyclic carbonates (e.g., ethylene carbonate (EC), propylene carbonate (PC), butylene carbonate (BC), fluoroethylene carbonate (FEC)) and/or linear carbonates (e.g., dimethyl carbonate (DMC), diethyl carbonate (DEC), ethylmethylcarbonate (EMC)). The second solvent may include fluorinated ethers, such as bis(2,2,2-trifluoroethyl) ether (BTFE), 1,1,2,2-tetrafluoroethyl 2,2,3,3-tetrafluoropropyl ether (TTE), 1,1,2,2-tetrafluoroethyl-2,2,3,3-tetrafluoropropyl ether, 1,1,2,3,3,3-hexafluoropropyl 2,2,2-trifluoroethyl ether, and combinations thereof.

The mixture of organic solvents may include a molar ratio of the first solvent to the second solvent that is greater than or equal to about 1:1 to less than or equal to about 1:4. The mixture of organic solvents may include a molar ratio of the first solvent to the second solvent that is greater than or equal to 1:1 to less than or equal to 1:4. In certain variations, the electrolyte 30 may include a molar ratio of the lithium salt to the first co-solvent that is greater than or equal to about 1:1.2 to less than or equal to about 1:2. The electrolyte 30 may include a molar ratio of the lithium salt to the first co-solvent that is greater than or equal to 1:1.2 to less than or equal to 1:2.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic material and a heat-resistant material. For example, the separator 26 may also be admixed with the ceramic material and/or the heat-resistant material, or one or more surfaces of the separator 26 may be coated with the ceramic material and/or the heat-resistant material. In certain variations, the ceramic material and/or the heat-resistant material may be disposed on one or more sides of the separator 26. The ceramic material may be selected from the group consisting of: alumina ($Al_2O_3$), silica ($SiO_2$), and combinations thereof. The heat-resistant material may be selected from the group consisting of: Nomex, Aramid, and combinations thereof.

Various conventionally available polymers and commercial products for forming the separator 26 are contemplated, as well as the many manufacturing methods that may be employed to produce such a microporous polymer separator 26. In each instance, the separator 26 may have a thickness greater than or equal to about 1 μm to less than or equal to about 50 μm, and in certain instances, optionally greater than or equal to about 1 μm to less than or equal to about 20 μm. The separator 26 may have a thickness greater than or equal to 1 μm to less than or equal to 50 μm, and in certain instances, optionally greater than or equal to 1 μm to less than or equal to 20 μm.

The negative electrode 22 is formed from a host material that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode 22. For example, in certain variations, the negative electrode 22 may include a plurality of solid-state electrolyte particles (not shown). In each instance, the negative electrode 22 (including the one or more layers) may have a thickness greater than or equal to about 1 μm to less than or equal to about 500 μm, and in certain aspects, optionally greater than or equal to about 10

μm to less than or equal to about 200 μm. The negative electrode 22 (including the one or more layers) may have a thickness greater than or equal to 1 μm to less than or equal to 500 μm, and in certain aspects, optionally greater than or equal to 10 μm to less than or equal to 200 μm.

In various aspects, the negative electrode 22 may include a negative electroactive material that comprises lithium, such as, for example, lithium metal foil or lithium metal powders. In certain variations, the negative electrode may be a film or layer formed of lithium metal. In certain variations, the negative electroactive material(s) in the negative electrode 22 may be optionally intermingled with one or more electrically conductive materials that provide an electron conductive path and/or at least one polymeric binder material that improves the structural integrity of the negative electrode 22.

For example, the negative electroactive material(s) in the negative electrode 22 may be optionally intermingled (e.g., slurry casted) with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

In various aspects, the negative electrode 22 may include greater than or equal to about 5 wt. % to less than or equal to about 99 wt. %, optionally greater than or equal to about 10 wt. % to less than or equal to about 99 wt. %, and in certain variations, greater than or equal to about 50 wt. % to less than or equal to about 95 wt. %, of the negative electroactive material(s); greater than or equal to 0 wt. % to less than or equal to about 40 wt. %, and in certain aspects, optionally greater than or equal to about 1 wt. % to less than or equal to about 20 wt. %, of the electronically conducting material(s); and greater than or equal to 0 wt. % to less than or equal to about 40 wt. %, and in certain aspects, optionally greater than or equal to about 1 wt. % to less than or equal to about 20 wt. %, of the at least one polymeric binder.

In various aspects, the negative electrode 22 may include greater than or equal to 5 wt. % to less than or equal to 99 wt. %, optionally greater than or equal to 10 wt. % to less than or equal to 99 wt. %, and in certain variations, greater than or equal to 50 wt. % to less than or equal to 95 wt. %, of the negative electroactive material(s); greater than or equal to 0 wt. % to less than or equal to 40 wt. %, and in certain aspects, optionally greater than or equal to 1 wt. % to less than or equal to 20 wt. %, of the electronically conducting material(s); and greater than or equal to 0 wt. % to less than or equal to 40 wt. %, and in certain aspects, optionally greater than or equal to 1 wt. % to less than or equal to 20 wt. %, of the at least one polymeric binder.

The positive electrode 24 may be formed from a lithium-based active material that is capable of undergoing lithium intercalation and deintercalation, alloying and dealloying, or plating and stripping, while functioning as the positive terminal of the battery 20. The positive electrode 24 can be defined by a plurality of electroactive material particles (not shown). Such positive electroactive material particles may be disposed in one or more layers so as to define the three-dimensional structure of the positive electrode 24. The electrolyte 30 may be introduced, for example after cell assembly, and contained within pores (not shown) of the positive electrode 24. For example, in certain variations, the positive electrode 24 may include a plurality of solid-state electrolyte particles (not shown). In each instance, the positive electrode 24 may have a thickness greater than or equal to about 1 μm to less than or equal to about 500 μm, and in certain aspects, optionally greater than or equal to about 10 μm to less than or equal to about 200 μm. The positive electrode 24 may have a thickness greater than or equal to 1 μm to less than or equal to 500 μm, and in certain aspects, optionally greater than or equal to 10 μm to less than or equal to 200 μm.

One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$) (LMO), lithium manganese nickel oxide ($LiMn_{(2-x)}Ni_xO_4$, where $0 \leq x \leq 0.5$) (NMC) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O2$), or a lithium nickel cobalt metal oxide ($LiNi_{(1-x-y)}Co_xM_yO_2$, where $0<x<0.2$, $y<0.2$, and M may be Al, Mg, Ti, or the like); or a lithium iron polyanion oxide with olivine structure, such as lithium iron phosphate ($LiFePO_4$) (LFP), lithium manganese-iron phosphate ($LiMn_{2-x}Fe_xPO_4$, where $0<x<0.3$) (LMFP), or lithium iron fluorophosphate ($Li_2FePO_4F$).

In other instances, for example, in the instance of a lithium-sulfur battery, the positive electrode 24 includes a sulfur-containing positive electroactive material. The sulfur-containing positive electroactive material may be selected from the group consisting of: sulfur (S), sulfur-selenium (S—Se), sulfur-silicon (S—Si), sulfur-polyacrylonitrile (S-PAN), and combinations thereof. In such instances, the positive electrode 24 may also include a sulfur host material. For example, the positive electrode 24 may include greater than or equal to about 20 wt. % to less than or equal to about 98 wt. %, and in certain aspects, optionally greater than or equal to about 60 wt. % to less than or equal to about 90 wt. %, of the sulfur-containing positive electroactive material, and greater than or equal to about 2 wt. % to less than or equal to about 60 wt. %, and in certain aspects, optionally greater than or equal to about 10 wt. % to less than or equal to about 30 wt. %, of the sulfur host material. The positive electrode 24 may include greater than or equal to 20 wt. % to less than or equal to 98 wt. %, and in certain aspects, optionally greater than or equal to 60 wt. % to less than or equal to 90 wt. %, of the sulfur-containing positive electroactive material, and greater than or equal to 2 wt. % to less than or equal to 60 wt. %, and in certain aspects, optionally greater than or equal to 10 wt. % to less than or equal to 30 wt. %, of the sulfur host material.

In various aspects, the sulfur host material may be a carbon-based host, including, for example only, carbon nanotubes, amorphous carbon (e.g., carbon black, such as KETJENBLACK®), porous carbon, carbon nanofibers, carbon spheres, carbon nanocage, graphene, graphene oxide, reduced graphene oxide, doped carbon (e.g., N-doped carbon nanotubes), and hybrids and the like. In certain variations, the sulfur host material may be a conducting polymerbased host, including, for example only, polyaniline (PAN), polypyrrole (PPy), polythiophene (Pt), polyaniline (PAni), poly(3,4-ethylenedioxythiophene:poly(styrenesulfonate) (PEDOT:PSS), and the like. In other variations, the sulfur host material may be a metal oxide-base host including, for example only, $TiO_2$, $SiO_2$, $CoS_2$, $Ti_4O_7$, $CeO_2$, $MoO_3$, $V_2O_5$, $SnO_2$, and the like; a metal sulfide-based host including, for example only, $Ni_3S_2$, $MoS_2$, FeS, $VS_2$, $TiS_2$, TiS, $CoS_2$, $Co_9S_8$, NbS, and the like; a metal nitride-based host including, for example only, VN, TiN, $Ni_2N$, CrN, ZrN, NbN, and the like; metal carbide-based host including, for example only, TiC, $Ti_2C$, $B_4C$, and the like; metal organic framework (MOF)-based host including, for example only, Ni-based-MOFs, Ce-based-MOFs, and the like; and hybrids or combinations thereof (e.g., polypyrrole/graphene, vanadium nitride/graphene, and the like). In still other variations, the sulfur host material may include $MgB_2$, $TiCl_2$, phosphorene, $C_3B$, $Li_4Ti_5O_{12}$, and the like. Such sulfur host materials may enhance electron transfer at the sulfur/host interface, accommodate volumetric changes within the cell 20, minimize polysulfide shuttles, and/or promote conversions among polysulfide intermediates.

In each instance, the positive electroactive material(s) in the positive electrode 24 may be optionally intermingled with an electronically conducting material that provides an electron conduction path and/or at least one polymeric binder material that improves the structural integrity of the electrode 24. For example, the positive electroactive material(s) in the positive electrode 24 may be optionally intermingled (e.g., slurry casted) with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETJEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

In various aspects, the positive electrode 24 may include greater than or equal to about 5 wt. % to less than or equal to about 99 wt. %, optionally greater than or equal to about 10 wt. % to less than or equal to about 99 wt. %, and in certain variations, greater than or equal to about 50 wt. % to less than or equal to about 98 wt. %, of the positive electroactive material(s); greater than or equal to 0 wt. % to less than or equal to about 40 wt. %, and in certain aspects, optionally greater than or equal to about 1 wt. % to less than or equal to about 20 wt. %, of the electronically conducting material(s); and greater than or equal to 0 wt. % to less than or equal to about 40 wt. %, and in certain aspects, optionally greater than or equal to about 1 wt. % to less than or equal to about 20 wt. %, of the at least one polymeric binder.

In various aspects, the positive electrode 24 may include greater than or equal to 5 wt. % to less than or equal to 99 wt. %, optionally greater than or equal to 10 wt. % to less than or equal to 99 wt. %, and in certain variations, greater than or equal to 50 wt. % to less than or equal to 98 wt. %, of the positive electroactive material(s); greater than or equal to 0 wt. % to less than or equal to 40 wt. %, and in certain aspects, optionally greater than or equal to 1 wt. % to less than or equal to 20 wt. %, of the electronically conducting material(s); and greater than or equal to 0 wt. % to less than or equal to 40 wt. %, and in certain aspects, optionally greater than or equal to 1 wt. % to less than or equal to 20 wt. %, of the at least one polymeric binder.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrolyte system for an electrochemical cell that cycles lithium ions, the electrolyte system comprising:
   an aliphatic fluorinated disulfonimide lithium salt comprising lithium (fluorosulfonyl)(trifluoromethanesulfonyl)imide) in a mixture of organic solvents, wherein the mixture of organic solvents comprises a first solvent and a second solvent, the first solvent comprising an ether solvent, a carbonate solvent, or a mixture of ether and carbonate solvents, and the second solvent comprising a fluorinated ether wherein the fluorinated ether is selected from the group consisting of: bis(2,2,2-trifluoroethyl)ether (BTFE), 1,1,2,2-tetrafluoroethyl 2,2,3,3-tetrafluoropropyl ether (TTE), 1,1,2,2-tetrafluoroethyl-2,2,3,3-tetrafluoropropyl ether, 1,1,2,3,3,3-hexafluoropropyl 2,2,2-trifluoroethyl ether, and combinations thereof.

2. The electrolyte system of claim 1, wherein the aliphatic fluorinated disulfonimide lithium salt further comprises lithium bis(fluorosulfonyl)imide, lithium bis(trifluoromethanesulfonyl)imide, or a combination of lithium bis(fluorosulfonyl)imide and lithium bis(trifluoromethanesulfonyl) imide.

3. The electrolyte system of claim 1, wherein a molar ratio of the aliphatic fluorinated disulfonimide lithium salt to the first solvent is greater than or equal to about 1:1.2 to less than or equal to about 1:2.

4. The electrolyte system of claim 1, wherein a molar ratio of the first solvent to the second solvent is greater than or equal to about 1:1 to less than or equal to about 1:4.

5. The electrolyte system of claim 1, wherein the ether solvent is a chain ether selected from the group consisting of: 1,2-dimethoxyethane (DME), 1-2-diethoxyethane, ethoxymethoxyethane, and combinations thereof.

6. The electrolyte system of claim 1, wherein the ether solvent is a cyclic ether selected from the group consisting of: tetrahydrofuran, 2-methyltetrahydrofuran, and combinations thereof.

7. The electrolyte system of claim 1, wherein the ether solvent is selected from the group consisting of: 1,2-dimethoxyethane (DME), 1-2-diethoxyethane, ethoxymethoxyethane, tetrahydrofuran, 2-methyltetrahydrofuran, and combinations thereof.

8. The electrolyte system of claim 1, wherein the carbonate solvent is a cyclic carbonate selected from the group consisting of: ethylene carbonate (EC), propylene carbonate (PC), butylene carbonate (BC), fluoroethylene carbonate (FEC), and combinations thereof.

9. The electrolyte system of claim 1, wherein the carbonate solvent is a linear carbonate selected from the group consisting of: dimethyl carbonate (DMC), diethyl carbonate (DEC), ethylmethylcarbonate (EMC), and combinations thereof.

10. The electrolyte system of claim 1, wherein the carbonate solvent is selected from the group consisting of: ethylene carbonate (EC), propylene carbonate (PC), butylene carbonate (BC), fluoroethylene carbonate (FEC), dimethyl carbonate (DMC), diethyl carbonate (DEC), ethylmethylcarbonate (EMC), and combinations thereof.

11. An electrochemical cell that cycles lithium ions, the electrochemical cell comprising:
a first electrode comprising a first electroactive material;
a second electrode comprising a second electroactive material;
a separator disposed between the first and second electrodes; and
an electrolyte system disposed within at least one of the first electrode, the second electrode, and the separator, wherein the electrolyte system comprising:
an aliphatic fluorinated disulfonimide lithium salt comprising lithium (fluorosulfonyl)(trifluoromethanesulfonyl)imide) in a mixture of organic solvents, wherein the mixture of organic solvents comprises a first solvent and a second solvent, the first solvent comprising an ether solvent, a carbonate solvent, or a mixture of ether and carbonate solvents, and the second solvent comprising a fluorinated ether wherein the fluorinated ether is selected from the group consisting of: bis(2,2,2-trifluoroethyl)ether (BTFE), 1,1,2,2-tetrafluoroethyl 2,2,3,3-tetrafluoropropyl ether (TTE), 1,1,2,2-tetrafluoroethyl-2,2,3,3-tetrafluoropropyl ether, 1,1,2,3,3,3-hexafluoropropyl 2,2,2-trifluoroethyl ether, and combinations thereof.

12. The electrochemical cell of claim 11, wherein the aliphatic fluorinated disulfonimide lithium salt further comprises lithium bis(fluorosulfonyl)imide, lithium bis(trifluoromethanesulfonyl)imide, or a combination of lithium bis(fluorosulfonyl)imide and lithium bis(trifluoromethanesulfonyl)imide.

13. The electrochemical cell of claim 11, wherein the first electroactive material is a high-nickel positive electroactive material represented by $Ni_xMn_yCo_zO_2$, where x, y, and z are all ≤1 and x+y+z=1.

14. The electrochemical cell of claim 11, wherein the first electroactive material is a sulfur-containing positive electroactive material selected from the group consisting of: sulfur (S), sulfur-selenium (S—Se), sulfur-silicon (S—Si), sulfur-polyacrylonitrile (S-PAN), and combinations thereof.

15. The electrochemical cell of claim 11, wherein the second electroactive material comprises a lithium metal.

16. The electrochemical cell of claim 11, wherein a molar ratio of the aliphatic fluorinated disulfonimide lithium salt to the first solvent is greater than or equal to about 1:1.2 to less than or equal to about 1:2.

17. The electrochemical cell of claim 11, wherein a molar ratio of the first solvent to the second solvent is greater than or equal to about 1:1 to less than or equal to about 1:4.

18. The electrochemical cell of claim 11, wherein the ether solvent is selected from the group consisting of: 1,2-dimethoxyethane (DME), 1-2-diethoxyethane, ethoxymethoxyethane, tetrahydrofuran, 2-methyltetrahydrofuran, and combinations thereof, and
the carbonate solvent is selected from the group consisting of: ethylene carbonate (EC), propylene carbonate (PC), butylene carbonate (BC), fluoroethylene carbonate (FEC), dimethyl carbonate (DMC), diethyl carbonate (DEC), ethylmethylcarbonate (EMC), and combinations thereof.

19. An electrolyte system for an electrochemical cell that cycles lithium ions, the electrolyte system comprising:
an aliphatic fluorinated disulfonimide lithium salt comprising lithium (fluorosulfonyl)(trifluoromethanesulfonyl)imide) in a mixture of organic solvents, wherein the mixture of organic solvents comprises a first solvent and a second solvent, a molar ratio of the first solvent to the second solvent is greater than or equal to about 1:1 to less than or equal to about 1:4, a molar ratio of the aliphatic fluorinated disulfonimide lithium salt to the first solvent is greater than or equal to about 1:1.2 to less than or equal to about 1:2, the first solvent comprising an ether solvent, a carbonate solvent, or a mixture of ether and carbonate solvents, and the second solvent comprising a fluorinated ether wherein the fluorinated ether is selected from the group consisting of: bis(2,2,2-trifluoroethyl)ether (BTFE), 1,1,2,2-tetrafluoroethyl 2,2,3,3-tetrafluoropropyl ether (TTE), 1,1,2,2-tetrafluoroethyl-2,2,3,3-tetrafluoropropyl ether, 1,1,2,3,3,3-hexafluoropropyl 2,2,2-trifluoroethyl ether, and combinations thereof.

\* \* \* \* \*